(12) United States Patent
Lerner et al.

(10) Patent No.: US 7,249,843 B2
(45) Date of Patent: Jul. 31, 2007

(54) ADJUSTABLE TENSIONING SYSTEM FOR RIMLESS EYEWEAR

(75) Inventors: Ira S. Lerner, New York, NY (US); James F. Pilat, Jr., New York, NY (US)

(73) Assignee: ISL Technologies, LLC, New York, NY (US)

( * ) Notice: Subject to any disclaimer, the term of this patent is extended or adjusted under 35 U.S.C. 154(b) by 0 days.

(21) Appl. No.: 10/846,953

(22) Filed: May 14, 2004

(65) Prior Publication Data

US 2005/0254000 A1 Nov. 17, 2005

(51) Int. Cl.
*G02C 1/00* (2006.01)

(52) U.S. Cl. .............. 351/86; 351/41; 351/83

(58) Field of Classification Search ......... 351/90, 351/92, 21, 110, 96, 103, 106, 86, 83, 41
See application file for complete search history.

(56) References Cited

U.S. PATENT DOCUMENTS

| 188,246 | A | 3/1877 | Johnson |
|---|---|---|---|
| 1,358,200 | A | 11/1920 | Hansen |
| 1,679,233 | A | 7/1928 | Strauss |
| 1,907,749 | A | 5/1933 | Dechau |
| 1,936,319 | A | 11/1933 | Wingate |
| 2,065,122 | A | 12/1936 | Diggins |
| 2,141,063 | A | 12/1938 | Euler |
| 2,254,637 | A | 9/1941 | Welsh |
| 2,492,072 | A | 12/1949 | Tapner |
| D170,435 | S | 9/1953 | Weissman |
| 2,737,847 | A | 3/1956 | Tesauro |
| 2,770,168 | A | 11/1956 | Tesauro |
| 3,498,701 | A | 3/1970 | Miller |
| 3,531,118 | A | 9/1970 | Mabie et al. |
| 3,531,188 | A | 9/1970 | LeBlanc et al. |
| 3,531,190 | A | 9/1970 | Leblanc et al. |
| 3,565,517 | A | 2/1971 | Gitlin et al. |
| 3,582,192 | A | 6/1971 | Gitlin |
| D221,480 | S | 8/1971 | Luc et al. |
| 3,838,914 | A | 10/1974 | Fernandez |
| 4,021,892 | A | 5/1977 | Piper |
| 4,070,103 | A | 1/1978 | Meeker |
| 4,196,981 | A | 4/1980 | Waldrop |
| 4,380,379 | A | 4/1983 | Ahern et al. |

(Continued)

FOREIGN PATENT DOCUMENTS

CH 572 222 1/1976

(Continued)

OTHER PUBLICATIONS

International Glasses Design Competition '93 Japan, Issued on Oct. 5, 1993, pp. 22,30,32,33,36,40,49,50,70.

(Continued)

*Primary Examiner*—Hung Xuan Dang
(74) *Attorney, Agent, or Firm*—Knobbe Martens Olson & Bear LLP

(57) ABSTRACT

Rimless eyewear features a wire that encircles a lens. Systems are provided for selectively increasing or decreasing a tensile load on the wire to facilitate assembly and maintenance of the eyewear. An adjusting screw, different wire securement positions, and/or adjustment shims provide easy tension adjustment of the wire and secure the eye lens in a predetermined position and orientation.

15 Claims, 13 Drawing Sheets

U.S. PATENT DOCUMENTS

| | | |
|---|---|---|
| 4,432,616 A | 2/1984 | Kurosaka |
| 4,466,713 A | 8/1984 | Tanaka |
| 4,523,819 A | 6/1985 | Dianitsch et al. |
| 4,547,909 A | 10/1985 | Bell |
| 4,685,782 A | 8/1987 | Lhospice |
| D291,808 S | 9/1987 | Meyerspeer |
| 4,822,158 A | 4/1989 | Porsche |
| 4,878,749 A | 11/1989 | McGee |
| D307,756 S | 5/1990 | Porsche |
| 4,958,923 A | 9/1990 | Rosenson |
| 4,958,924 A | 9/1990 | Parker |
| 4,973,148 A | 11/1990 | Gazeley |
| 4,988,181 A | 1/1991 | Riach, Jr. |
| 5,048,944 A | 9/1991 | Porsche |
| 5,162,824 A | 11/1992 | Klemka |
| 5,181,051 A | 1/1993 | Townsend et al. |
| 5,243,366 A | 9/1993 | Blevins |
| 5,321,442 A | 6/1994 | Albanese |
| 5,355,184 A | 10/1994 | Varveris et al. |
| 5,371,554 A | 12/1994 | Aspesi |
| 5,389,981 A | 2/1995 | Riach, Jr. |
| 5,410,763 A | 5/1995 | Bolle |
| 5,416,537 A | 5/1995 | Sadler |
| 5,423,712 A | 6/1995 | Underwood et al. |
| 5,428,407 A | 6/1995 | Sheffield |
| 5,431,595 A | 7/1995 | Underwood |
| D371,567 S | 7/1996 | Fukuchi |
| 5,568,207 A | 10/1996 | Chao |
| 5,592,243 A | 1/1997 | Chao |
| 5,642,177 A | 6/1997 | Nishioka |
| 5,654,785 A | 8/1997 | Shih et al. |
| 5,663,780 A | 9/1997 | Murai et al. |
| 5,684,558 A | 11/1997 | Hamamoto |
| 5,710,614 A | 1/1998 | Cereda |
| 5,724,118 A | 3/1998 | Krebs |
| 5,737,054 A | 4/1998 | Chao |
| 5,867,244 A | 2/1999 | Martin |
| 5,889,574 A | 3/1999 | Gandl-Schiller |
| 5,912,718 A | 6/1999 | Murai et al. |
| 5,914,768 A | 6/1999 | Hyoi |
| 6,027,214 A | 2/2000 | Graham |
| 6,089,706 A | 7/2000 | Pilat, Jr. |
| 6,099,119 A | 8/2000 | Kim |
| 6,139,142 A | 10/2000 | Zelman |
| 6,149,269 A | 11/2000 | Madison |
| 6,264,325 B1 | 7/2001 | Peressini et al. |
| 6,264,326 B1 | 7/2001 | Hyoi |
| 6,343,858 B1 | 2/2002 | Zelman |
| 6,588,897 B1 | 7/2003 | Nadler et al. |
| 6,595,634 B1 | 7/2003 | Pilat, Jr. |
| 2005/0007546 A1 | 1/2005 | Pilat et al. |

FOREIGN PATENT DOCUMENTS

| | | |
|---|---|---|
| CN | 1117593 | 2/1996 |
| DE | 17 97 366 | 1/1971 |
| DE | 85 07 761 U1 | 5/1985 |
| DE | 34 13 827 A1 | 8/1985 |
| DE | 88 06 898 U1 | 10/1988 |
| DE | 39 05 041 A1 | 8/1990 |
| DE | 39 19 489 A1 | 12/1990 |
| DE | 39 20 879 A1 | 1/1991 |
| DE | 39 21 987 A1 | 1/1991 |
| DE | 39 33 310 A1 | 1/1991 |
| DE | 92 16 919 U1 | 4/1993 |
| DE | 43 16 698 A1 | 11/1994 |
| DE | 295 18 590 | 11/1995 |
| DE | 295 16 670 U1 | 5/1996 |
| EP | 0 502 796 B1 | 2/1992 |
| EP | 0 469 699 A1 | 5/1992 |
| EP | 0 743 545 A1 | 11/1996 |
| EP | 0 955 560 | 11/1999 |
| FR | 915421 | 11/1946 |
| FR | 1037755 | 9/1953 |
| FR | 1061253 | 4/1954 |
| FR | 1266652 | 6/1961 |
| FR | 2 483 632 | 4/1981 |
| FR | 2 657 436 A1 | 7/1991 |
| GB | 812880 | 5/1959 |
| GB | 846425 | 8/1960 |
| GB | 855268 | 11/1960 |
| JP | 56-072983 | 5/1956 |
| JP | 44-15392 | 7/1969 |
| JP | 54-111841 | 9/1979 |
| JP | 54-111842 | 9/1979 |
| JP | 54-163052 | 12/1979 |
| JP | 55-50217 | 4/1980 |
| JP | 55-083022 | 6/1980 |
| JP | 55-133014 | 10/1980 |
| JP | 55-135814 | 10/1980 |
| JP | 56-29209 | 3/1981 |
| JP | 56-095214 | 8/1981 |
| JP | 56-153317 | 11/1981 |
| JP | 57-178215 | 11/1982 |
| JP | 57-184910 | 11/1982 |
| JP | 60-146217 | 8/1985 |
| JP | 61-2621 | 1/1986 |
| JP | 63-188626 | 12/1988 |
| JP | 1-136114 | 5/1989 |
| JP | 5-157997 | 6/1993 |
| JP | 05-196899 | 8/1993 |
| JP | 5-40493 | 10/1993 |
| JP | 05-289029 | 11/1993 |
| JP | 06-265828 | 9/1994 |
| JP | 06-331943 | 12/1994 |
| JP | 07-028001 | 1/1995 |
| JP | 7-10722 | 2/1995 |
| JP | 07-056123 | 3/1995 |
| JP | 7-128620 | 5/1995 |
| JP | 07-244259 | 9/1995 |
| JP | 08-050263 | 2/1996 |
| JP | 274588 | 4/1996 |
| JP | 09-043544 | 2/1997 |
| JP | 09-061754 | 3/1997 |
| JP | 9-101489 | 4/1997 |
| JP | 7-156856 | 8/1997 |
| JP | 2000-122001 | 4/2000 |
| JP | 2001-166266 | 6/2001 |
| JP | 2002-031783 | 1/2002 |
| SU | 220885 | 9/1968 |
| WO | WO 90/09611 | 8/1990 |
| WO | WO 95/18986 | 7/1995 |
| WO | WO 95/23995 | 8/1995 |
| WO | WO 99/42890 | 8/1999 |
| WO | WO 03/040809 | 5/2003 |

OTHER PUBLICATIONS

New Product Announcement Supporting Material Q & A of Pentax Magnet Eyeglass Frame; Oct. 1995; Pentax Vision Co., Ltd & Hoya Corp.

Aspen Booth #1570 Ad.; Aspex—memoflex®, EASYCLIP™.

Rex-Oval Frame Drawing; Jan. 5, 1994; SUNREEVE.

TAKUMI-Oval Frame and Lens Designs Brochure; Sunreeve Co., Ltd.: "Takumi-Oval" series.

Publication of Pat. No. 5,389,981; Feb. 14, 1995; Eyeglasses Having Magnets Attached Thereto For Improving The Blood Circulation of the Eyes.

Pentax Vision Co., Ltd.; Oct. 3, 1995; Pentax Magnet Eyeglass Frames.

Twin Come Catalog Advertisement; Nov. 1995; They Change From Glasses to Sunglasses with One Touch; 5 pages.

Translation of DE 88 06 898; Oct. 27, 1988; Magnetic Spectacle Frame and Magnetic Attachment Lens Piece.

Japanese Patent Office Patent Journal; Kokai Utility Model No. SHO 61[1986]-2621; Jan. 9, 1986; Glasses Having Lenses Capable of Insertion and Removal.

Color photos of eyewear; 4 photos.

Baltimore Business Publications, Inc. 1995; Jul. 28, 1995; Copyright 1995; vol. 13; No. 10; Sec. 1; p. 2; Magnetic sunglasses by Chameez Inc, of Baltimore; 1 page.

PR Newswire Association, Inc.; Copyright 1995; Jul. 27, 1995; Section: Financial News; Magnetic Sunglases, Chameez, Inc., Baltimore, MD; 2 pages.

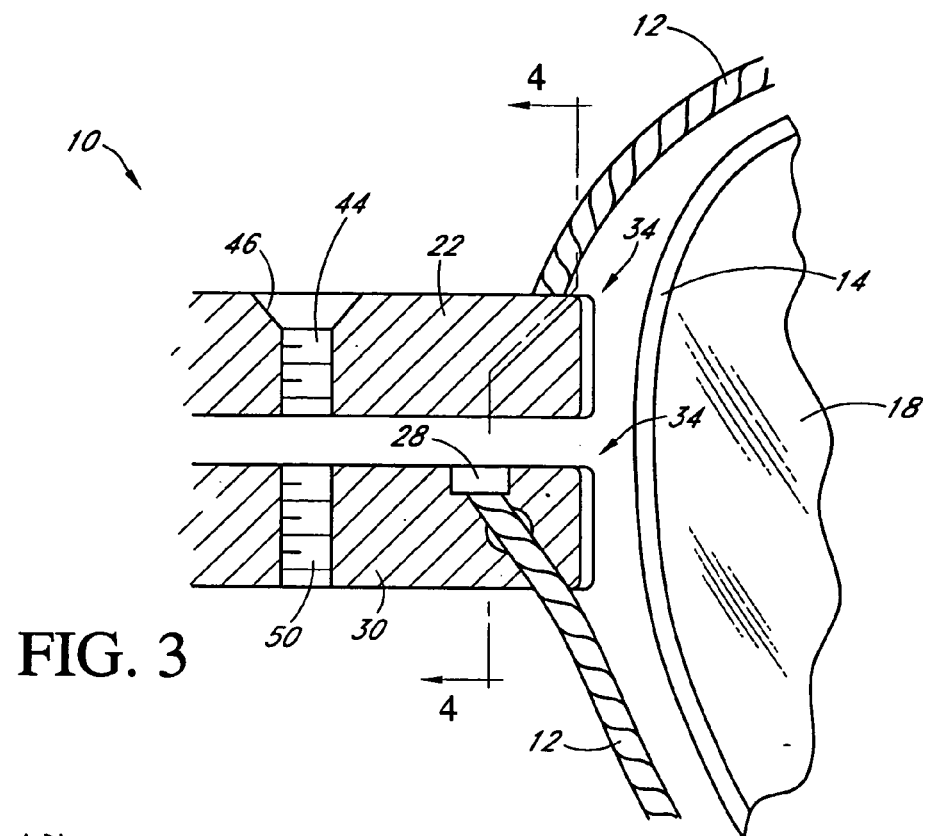
FIG. 3
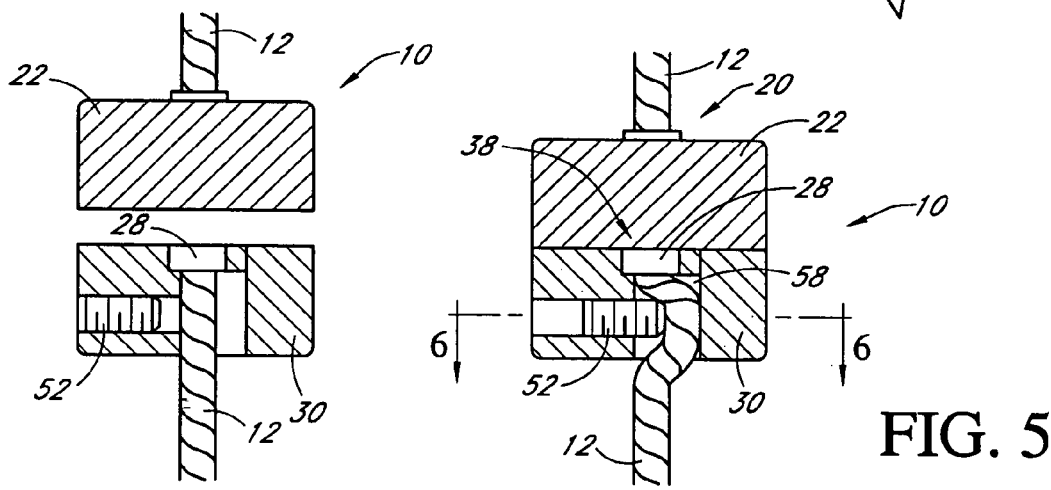
FIG. 4
FIG. 5
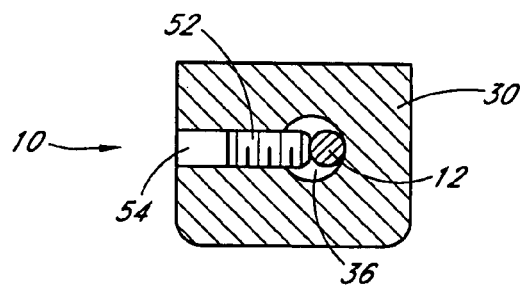
FIG. 6

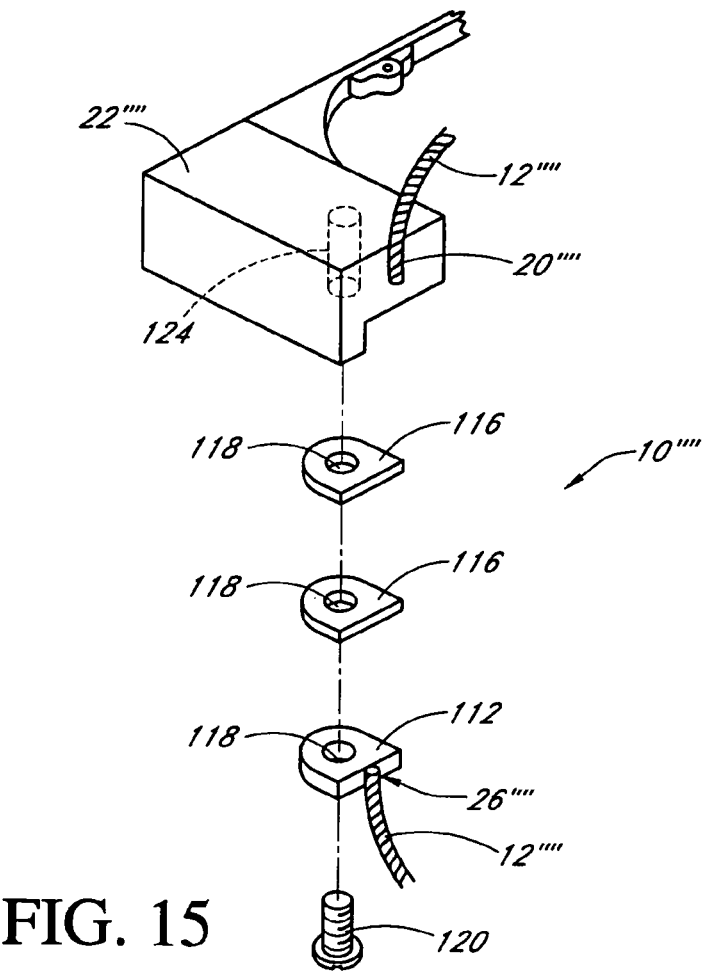
FIG. 15
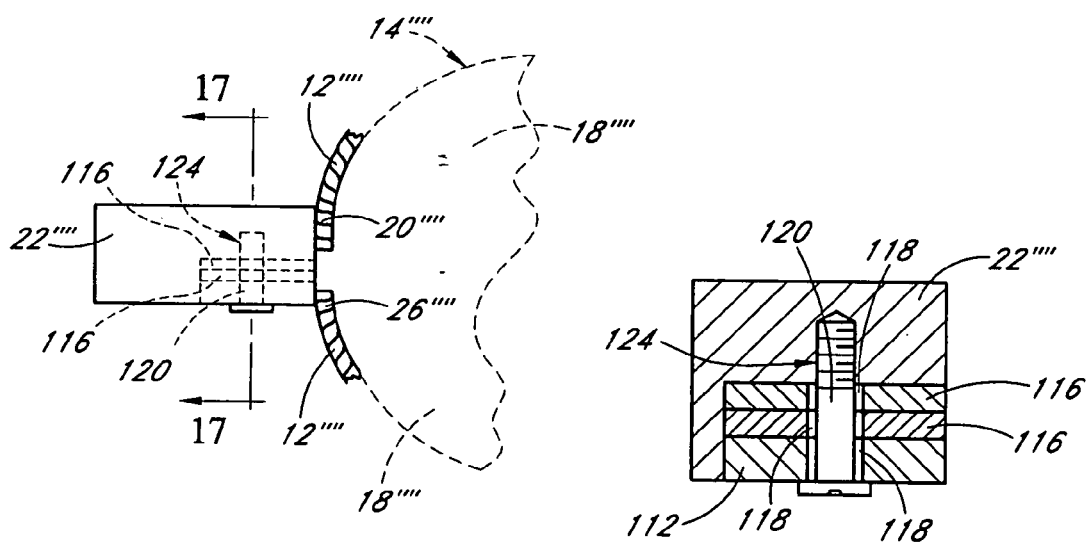
FIG. 16
FIG. 17

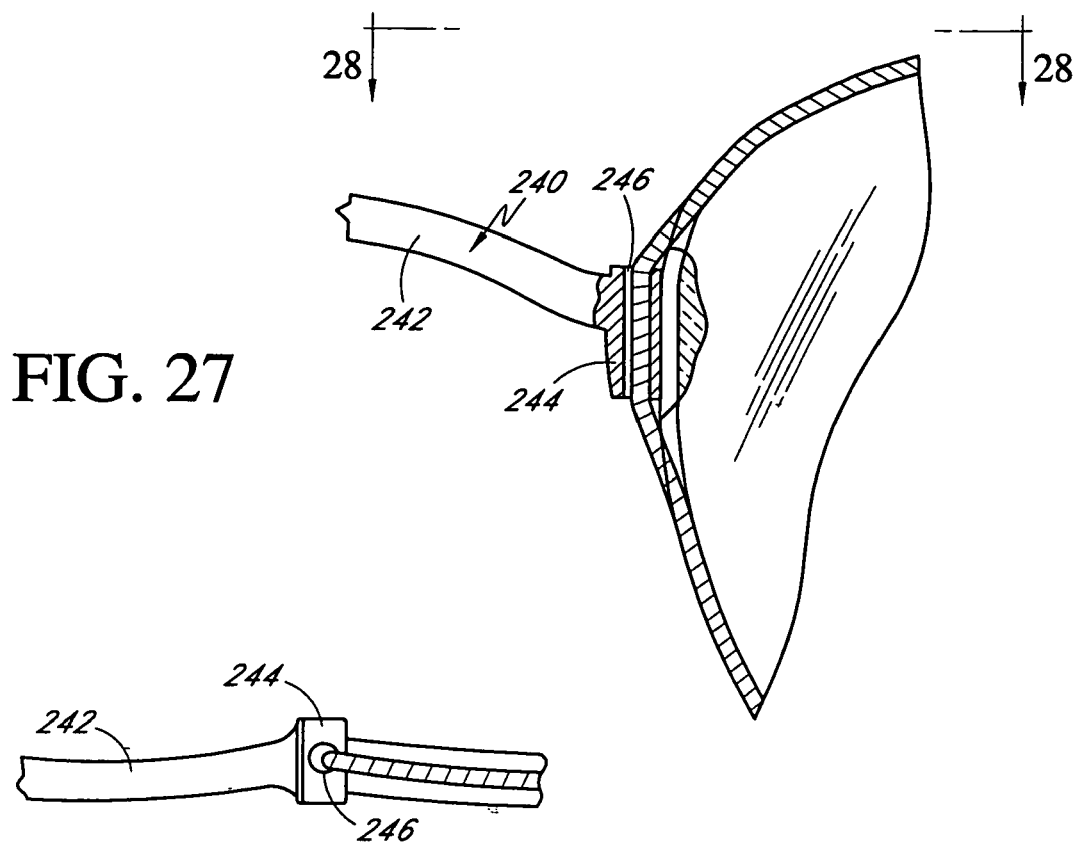
FIG. 27
FIG. 28
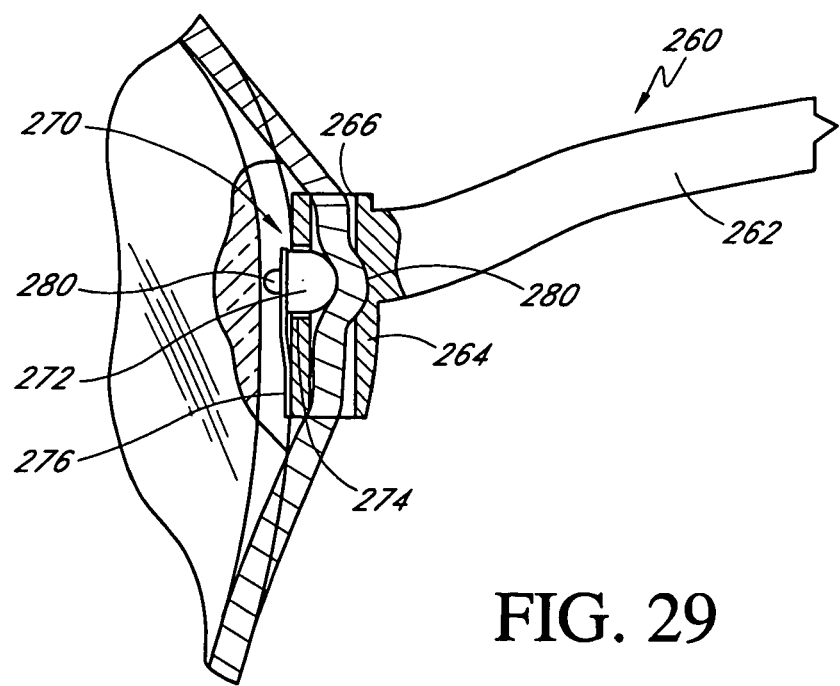
FIG. 29

ADJUSTABLE TENSIONING SYSTEM FOR RIMLESS EYEWEAR

BACKGROUND OF THE INVENTION

1. Field of the Invention

The present invention relates generally to an adjustable lens securing system for rimless eyewear, and more particularly to an adjustable tensioning system that allows easy assembly and adjustment of a wire used to secure at least one eye lens.

2. Description of the Related Art

Recently, developments in the eyewear industry have resulted in the creation of eyewear in which the lenses appear to be unattached to any frame. Such eyewear is being called "rimless." Temples and a bridge can be secured to the lenses with fasteners that extend through the lenses or with clamps that clamp over a portion of the lenses. Such arrangements result in a visible overlap of the mechanical structures used to support the lenses and the lenses themselves. Furthermore, while a goal of rimless eyewear is to minimize the visual impact created by the rim structures, many of these structures result in an emphasis on the components. Moreover, when preparing the lenses or when mounting the mechanical structures to the frames, the lenses are prone to chipping and cracking, which results in the lenses having to be discarded and increase the ultimate cost to the consumer of the eyewear. In addition, these mounting systems require highly precise drilling of holes, notches, etc., such that costly and time consuming outside lens preparation services are often required.

SUMMARY OF THE INVENTION

Even more recently, a rimless style of eyewear has been proposed in which the lenses are substantially encircled by a thin, multiple filament wire. Examples of such eyewear are described in co-pending U.S. patent application Ser. No. 10/678,964, filed on Oct. 2, 2003, which is hereby incorporated by reference in its entirety, as well as the following applications from which that application claims priority: U.S. patent application Ser. No. 10/610,862, filed on Jun. 30, 2003, U.S. patent application Ser. No. 10/269,811, filed on Oct. 11, 200, and U.S. Provisional Patent Application No. 60/394837, filed on Jul. 10, 2002, each of which also are hereby incorporated by reference in their entirety.

The constructions described in the co-pending application generally require the wire to be sufficiently taut such that undesired movement of the components can be minimized or eliminated. The correct tautness or tension is achieved in many of these constructions only when the lenses are cut to the proper shape and size within very small tolerances. Given variations in the calibration and measuring systems of individual lens cutting equipment, and allowances for variations by the optical technicians using the equipment, this style of rimless eyewear admits to some improvements such that secure and practical rimless eyewear can be manufactured.

While various systems for adjustment and tensioning of the wire can be envisioned, it is preferred that the adjustment system have an exterior configuration that closely resembles a standard endpiece. Such a construction would minimize the visual prominence of the adjustment system. Moreover, such a construction would minimize any overlap of the lens by the system such that the prominence of the mounting structure can be reduced and the eyewear can become even more transparent to observers of the user of the eyewear.

Accordingly, certain aspects of the present invention are directed to an adjustment and tensioning system for rimless eyewear that comprise any of a number of embodiments of a flexible wire adjustment and tensioning mechanism. Various ones of the disclosed flexible wire adjustment and tensioning embodiments ensure ease of assembly as well as a system for adjusting the tension of the flexible wire that secures the lens in the rimless eyewear. In addition, it should be noted that the present invention may be used for many types of eyewear, including ophthalmic frames, sunglasses, magnetic eyewear and protective eyewear.

In most preferred embodiments, the system is sized and configured to fit within a housing or to define a housing that resembles endpieces in present eyewear systems. In other words, when assembled, the housing would have a height, a width and a depth, with at least one of the width and the depth being substantially greater than the height. In other words, most present eyewear feature endpieces (e.g., where the temples attach to the lens supporting structures) that do not have a height as the longest dimension.

An aspect of the present invention involves eyewear comprising a lens. The lens comprises a peripheral side surface with a groove being formed in the side surface. A wire generally encircles the lens with at least a portion of the wire being positioned within the groove. The wire comprises a first end and a second end. A first tensioning block is connected to the first end and a second tensioning block is connected to the second end. The second tensioning block has an abutment surface that generally abuts a portion of the first tensioning block. An anchor is positioned on the second end of the wire. The second tensioning block comprises a passage. The wire extends through the passage and the anchor is positioned proximate the abutment surface of the second tensioning block.

Another aspect of the present invention involves eyewear comprising a lens. The lens comprises a peripheral side surface with a groove being formed in the side surface. A wire generally encircles the lens. At least a portion of the wire is positioned within the groove. The wire comprises a first end and a second end. A first block is connected to the first end of the wire and a second block is connected to the second end of the wire. At least one of the first block and the second block comprises a plurality of slots. At least one of the first end of the wire and the second end of the wire comprises an anchor bar. The anchor bar is sized and configured to be secured within one of the plurality of slots.

A further aspect of the present invention involves eyewear comprising a lens. The lens comprises a peripheral side surface. A groove is formed in the side surface. A wire generally encircles the lens. At least a portion of the wire is positioned within the groove. The wire comprises a first end and a second end. A first block is connected to the first end of the wire. A second block is connected to the second end of the wire. The second block comprises an adjustment passage. The adjustment passage comprises a channel. An adjustment block is secured to the second end of the wire. The adjustment block comprises a tooth. The adjustment block is moveably positioned within the adjustment passage with the tooth being positioned within the channel. The adjustment block comprises a threaded portion. A threaded member extends through a portion of the second block and engages the threaded portion such that rotation of the threaded member results in movement of the adjustment block.

An additional aspect of the present invention involves eyewear comprising a lens. The lens comprises a peripheral side surface with a groove being formed in the side surface.

A wire generally encircles the lens with at least a portion of the wire being positioned within the groove. The wire comprises a first end and a second end. A first block is connected to the first end of the wire and a second block is connected to the second end of the wire. An anchor is secured to the second end of the wire. The anchor is rotatably secured within an adjustment screw. The adjustment screw is positioned within a threaded opening in the second block.

Yet another aspect of the present invention involves eyewear comprising a lens. The lens comprises a peripheral side surface with a groove being formed in the side surface. A wire generally encircles the lens with at least a portion of the wire being positioned within the groove. The wire comprises a first end and a second end. A first block connected to the first end of the wire. A mounting plate is secured to the second end of the wire. The mounting plate being securable to the first block with at least one shim being positioned between the mounting plate and the first block.

A further aspect of the present invention involves eyewear comprising a lens. The lens comprises a peripheral side surface with a groove being formed in the side surface. A wire generally encircles the lens with at least a portion of the wire being positioned within the groove. The wire comprises a first end and a second end. The first and second ends of the wire being connected to a first block and a second block. A tensioning recess formed in at least one of the first block and the second block and the first and second ends of the wire being positioned within the recess. The recess comprises a portion that is substantially the same width as one diameter of the wire. The recess also comprises a portion that is substantially larger that the one diameter of the wire. A threaded opening extends through at least one of the first block and the second block and intersects the substantially larger portion of the recess. A threaded member is positioned within the threaded opening.

Since there are many well-known methods of attaching temples to a projection extending from the outside perimeter edge of a lens, it should be understood in reading any descriptions of the embodiments of the present invention that any suitable method can be used to attach the temples to the various closing mechanisms described herein.

BRIEF DESCRIPTION OF THE DRAWINGS

Other features, aspects and advantages of the present invention will become apparent from the following more detailed description, taken in conjunction with the accompanying drawings, which illustrate, by way of example, some of the basic principles of the invention. Certain preferred embodiments are shown in the drawings, which are intended to illustrate and not to limit the invention.

FIG. 3 is a sectioned view of the system of FIG. 2.

FIG. 4 is a sectioned view of the system of FIG. 2 taken along the line A-A of FIG. 3, the view shows the system prior to assembly.

FIG. 5 is a sectioned view of the system of FIG. 2 taken along the line A-A of FIG. 3, the view shows the system following assembly and adjustment of tension.

FIG. 6 is a sectioned view of the system of FIG. 2 taken along the line B-B of FIG. 5.

FIG. 15 is an exploded perspective view of another wire tensioning system arranged and configured in accordance with certain features, aspects and advantages of the present invention and illustrating multiple tension adjustment shims.

FIG. 16 is an elevation view of the system of FIG. 15 illustrating a screw and two of the multiple tension adjustment shims installed.

FIG. 17 is a sectioned view of the system of FIG. 15 taken along the line E-E in FIG. 16.

FIG. 27 is an illustration of a further bridge construction for eyewear arranged and configured in accordance with some embodiments of the present invention.

FIG. 28 is a view along line I-I of the bridge construction shown in FIG. 27.

FIG. 29 is a sectioned view of a bridge construction for eyewear arranged and configured in accordance with some embodiments of the present invention.

DETAILED DESCRIPTION OF THE PREFERRED EMBODIMENT

Figure 1:
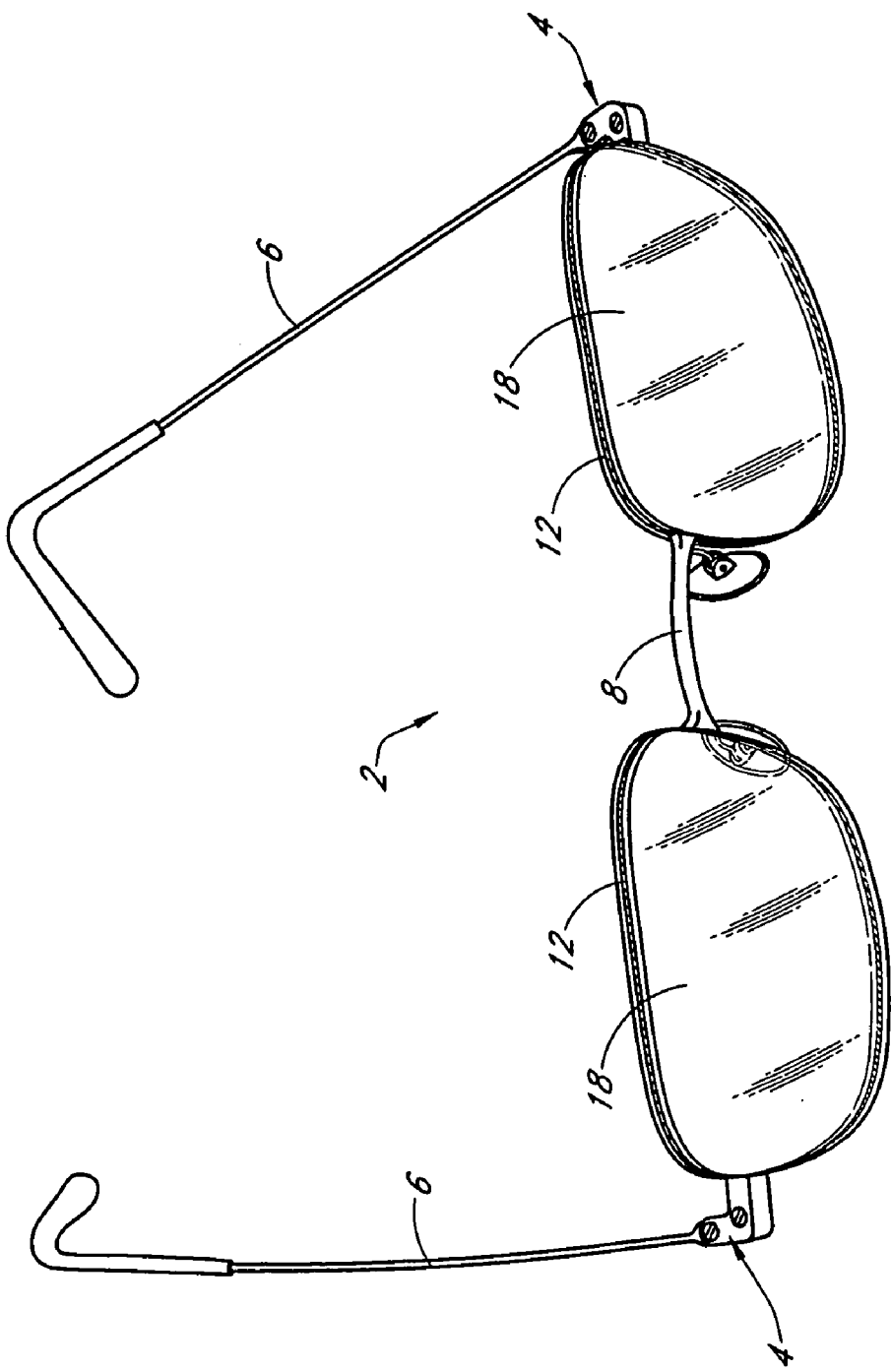
FIG. 1 is an example of eyewear arranged and configured in accordance with certain features aspects and advantages of the present invention.

The present invention generally relates to eyewear frame assemblies featuring a flexible wire that forms at least a major portion of a lens securing frame. In some arrangements, the flexible wire generally circumscribes the associated lens. To provide a generic frame assembly that is capable of providing customizable lens shapes and sizes, the wire can have a length sufficient to extend around a lens and can be tightened about the lens such that lenses of varied sizes and shapes can be secured within a single frame assembly. In all of the embodiments described herein, each lens can comprise a tinted lens, a corrective lens or any other desired type of lens, including but not limited to a protective lens.

Preferably, the wire extends around at least about 90% of the circumference of the associated lens. In some embodiments, the wire extends around at least about 95% of the circumference of the associated lens. In other embodiments, the wire extends almost entirely or entirely around the circumference of the associated lens. By extending the wire around substantially the entire circumference of the associated lens within a groove, a rimless look is provided to eyewear while creating a flexible and durable lens mounting system as compared to other rimless or semi-rimless eyewear (e.g., eyewear with the lens secured in an upper or lower metal frame with a nylon cord). In addition, such a construction is easy to assemble by opticians and the like without the use of costly and time consuming outside services often employed to assemble other types of fully rimless eyewear. The wire also can comprise two or more portions that generally encircle the lens. For instance, two wire portions can each extend about halfway around a lens such that the two portions together generally encircle the lens. The wire portions can have one end suitably secured to another eyewear component, such as, for example but without limitation, a bridge, closing member or temple hinge, while the other ends of the two wires can be secured together in any manner disclosed herein. Other numbers of wire portions also can be used but exceeding more than two wire portions can undesirably complicate assembly of the eyewear.

In some embodiments, rigid components, such as, for example but without limitation, a bridge, a brow bar, or closing members can be positioned along the circumference of the associated lens. Preferably, these rigid components together span less than about 10% of the total circumferential length of the lens. In some embodiments, the rigid components span less than about 5% of the total circumferential length. In some preferred embodiments, the closing members have a vertical dimension that is smaller than at least one of a lateral dimension and a rearward (i.e., toward the ear) dimension. Such embodiments reduce the aesthetic presence of the closing members and improve the rimless appearance of the eyewear.

Each wire desirably comprises a multiple filament construction. In other words, the wire preferably comprises more than one filament, fiber or strand. In some embodiments, the filaments are made from a metal, a metal alloy, a nylon, a polymer, a resin, a natural fiber or another naturally occurring or man-made material that is suitably strong in tension while maintaining sufficient flexibility to secure a lens in a manner described herein. In some embodiments, the wire may be manufactured of a type of fiber-optic material. While a single filament can be used and is practicable, it is currently believed that the multiple filament construction provides greater flexibility while maintaining sufficient strength for use in the manners described herein and, therefore, multiple filament constructions are preferred. Furthermore, multiple filament constructions increase the friction interface between the lenses and the wire, which friction helps secure the lens orientations relative to the other eyewear components.

The multiple filaments preferably are intertwined, braided or wrapped together to define the wire. The wire can be encased within a sheath, cover, jacket or casing, if desired. By enclosing the multiple filaments in a casing or the like, the filaments can be better protected against normal wear and tear that might otherwise occur. In one embodiment, the wire is constructed similarly to a braided fishing leader wire.

To provide a rimless appearance, the diameter of the wire should be sufficiently narrow. In some embodiments, the wire has an average diameter of between about 0.1 mm and about 3.0 mm. Preferably, the wire has an average diameter of between about 0.4 mm and about 1.6 mm, and more preferably has an average diameter of between about 0.4 mm and about 0.6 mm. In one embodiment, the wire has an average diameter of about 0.5 mm.

With reference to FIG. 1, eyewear 2 is shown featuring a wire tensioning system 10 that is arranged and configured in accordance with certain features, aspects and advantages of the present invention is shown. The tensioning system 10 can be used with any rimless eyewear, including those disclosed in copending U.S. patent application Ser. No. 10/678,964, filed on Oct. 2, 2003, U.S. patent application Ser. No. 10/610,862, filed on Jun. 30, 2003, U.S. patent application Ser. No. 10/269,811, filed on Oct. 11, 200, and U.S. Provisional Patent Application No. 60/394,837, filed on Jul. 10, 2002, which references are hereby incorporated by reference in their entirety. Copending U.S. patent application Ser. No. 10/846,357, filed concurrently herewith, entitled Eyeglass Frame Assembly; copending U.S. patent application Ser. No. 10/846,349, filed concurrently herewith, entitled Adjustable Tensioning System for Rimless Eyewear also are hereby incorporated by reference in their entirety. In general, the rimless eyewear 2 features a wire 12 that is positioned within a groove 14 in a lens 18 to secure the lens 18 in position. Closing members 4, which are described in detail below, can be used to close the wire 12 into a loop form. In some arrangements, the closing members 4 can be used to attach temples 6 or a bridge 8 to the lenses 18.

Figure 2:
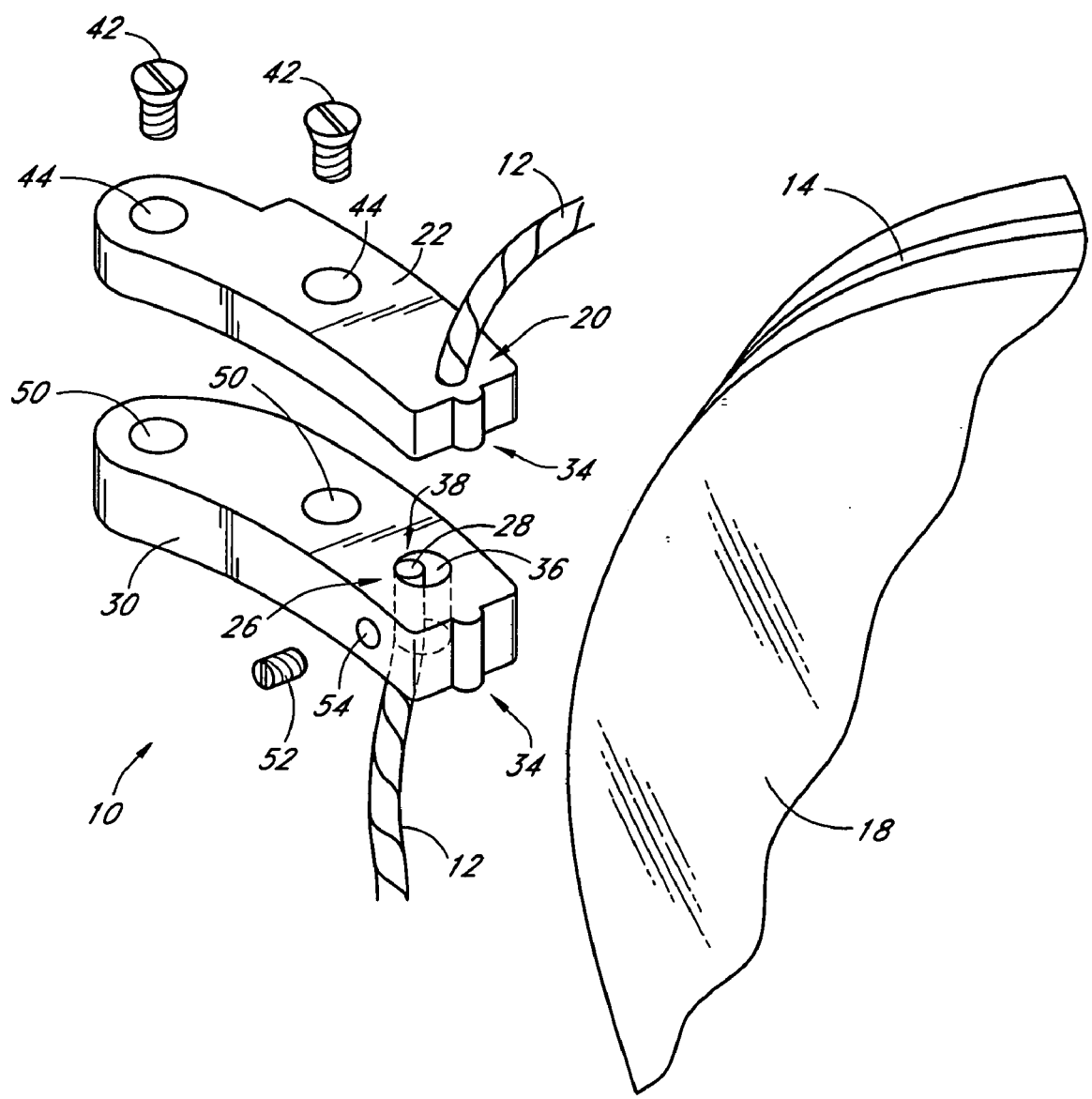
FIG. 2 is a front exploded perspective view of a wire tensioning system for pseudo rimless eyewear, which system is arranged and configured in accordance certain features, aspects and advantages of the present invention.

With reference now to FIG. 2, a first end 20 of the wire 12 can be secured to an upper tensioning block 22. The first end 20 of the wire 12 can be secured to the upper tensioning block 22 in any suitable manner, including but not limited to, bonding, welding, brazing, soldering, adhering, cohering, and other forms of mechanical connection using interlocking structures or the like.

A second end 26 of the wire 12 in the illustrated arrangement is connected to an anchor 28. The anchor 28 is adapted to be received within in a lower tensioning block 30 in a manner that will be described. The second end 26 of the wire 12 also can be connected to the lower tensioning block 30 in other suitable manners. Preferably, however, the second end 26 of the wire 12 is connected in a manner that allows the tension in the wire 12 to be adjusted. It also should be mentioned that the wire 12 can be split into separate pieces such that the first end and the second end are not necessary directly connected along a single piece of wire (e.g., the two wires can extend about the perimeter of the lens and be connected together in any suitable manner).

Figure 22:
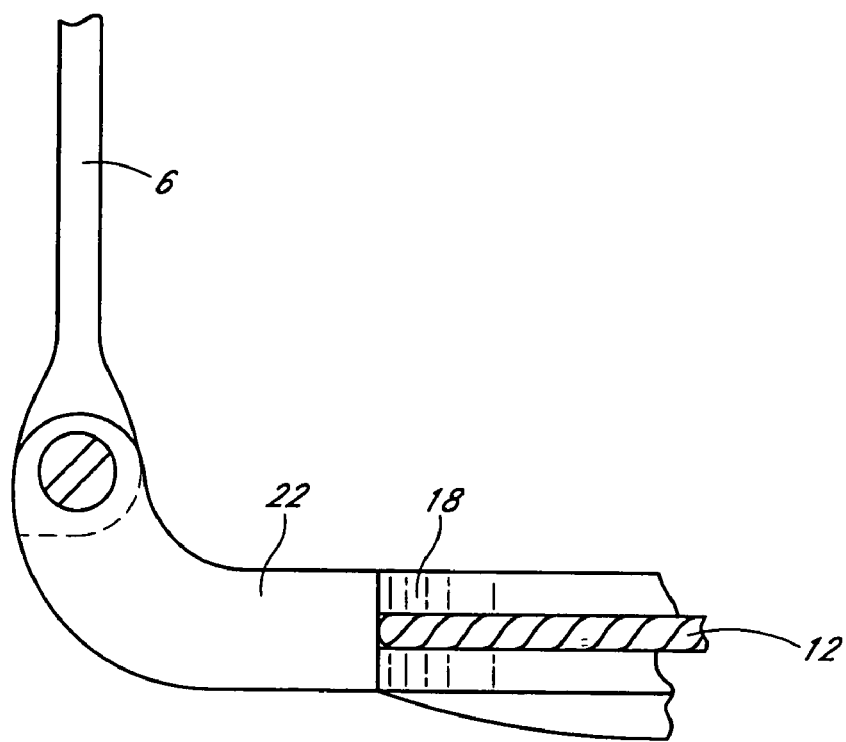
FIG. 22 is a simplified, partial top view of eyewear arranged and configured in accordance with certain features, aspects and advantages of the present invention and illustrating an interface between tension blocks and a lens.
Figure 23:
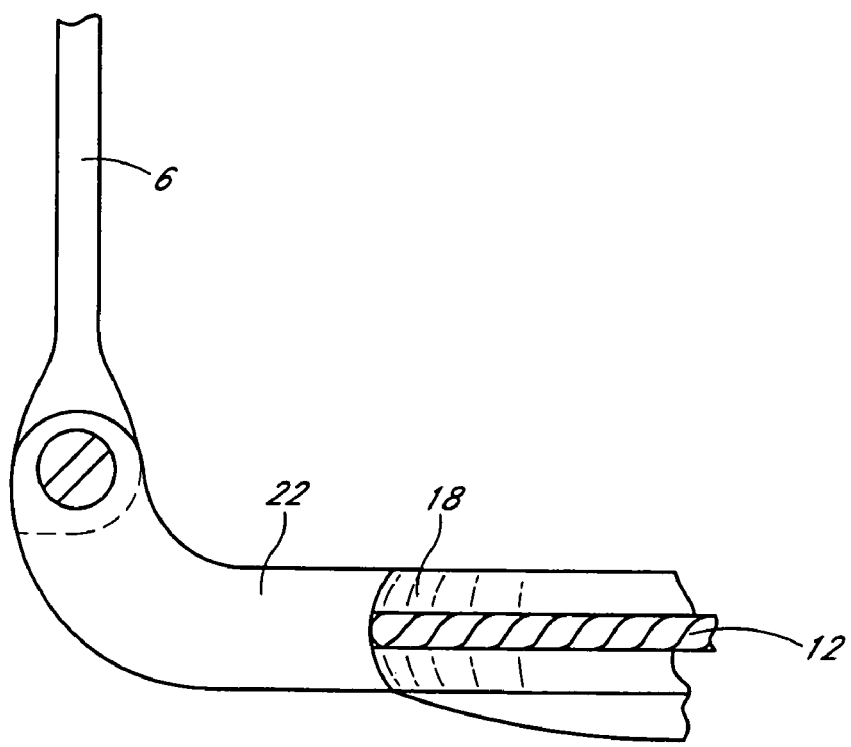
FIG. 23 is another simplified, partial top view of eyewear arranged and configured in accordance with certain features, aspects and advantages of the present invention and illustrating another interface between tension blocks and a lens.

With reference now to FIG. 2, a portion of each of the upper tensioning block 22 and a lower tensioning block 30 that lies generally adjacent the lens 18 preferably comprises a raised lip or tooth 34 that advantageously fits inside the groove 14 in the lens 18. The tooth 34 reduces the likelihood that the tensioning blocks 22, 30 will slide off of the peripheral side of the lens 18. Thus, the tooth advantageously enhances the stability of the mounting of the upper tensioning block 22 and the lower tensioning block 30 to the lens 18. In some arrangements, only the upper or the lower block 22, 30 will include the tooth 34. In other arrangements, such as those shown in FIGS. 22 and 23, neither block includes any teeth and generally flush connections are provided between the tensioning blocks 22, 30 and the periphery of the lenses 18. As also shown in FIGS. 22 and 23, the periphery of the lenses 18 can be generally square or more rounded (compare FIG. 22 to FIG. 23). Preferably, the contour of the abutting surface of at least one, and more preferably both, of the tensioning blocks 22, 20 is shaped to complement the peripheral surface of the associated lens 18.

With reference now to FIG. 4, the lower block 30 preferably comprises a passage 36 and a receptacle 38. The passage 36 and the receptacle 38 preferably are connected such that the wire 12 can be inserted into the passage 36 and the anchor 28 can be placed into the receptacle 38. It should be noted that throughout the disclosure, unless otherwise specified or apparent, diameters of any passages, bores, or other channels or formations that accept the wire preferably are sufficiently greater than the diameter of the associated wire to facilitate movement of the movement therein. In the illustrated arrangement, the passage 36 comprises a generally cylindrical tunnel. In some arrangements, the passage 36 can be a slot that extends through a surface of the lower block 30. In other arrangements, the receptacle 38 can be positioned on the upper block 22 and the passage can extend through at least a portion of both blocks. In further arrangements, the receptacle 38 can be positioned in the upper block 30 and the passage 36 can be a slot that extends through at least the upper block 22 and, in some arrangements, both the upper block 22 and the lower block 30. While arrangements with slots may have less strength in the blocks, assembly is more easily accomplished. Further, while arrangements with the receptacle 38 in the upper block 22 may have an advantage in that tensioning the wire 12 draws the blocks 22, 30 together, placing the receptacle 38 in the lower block 30 conceals the anchor 28.

The upper tensioning block 22 and the lower tensioning block 30 can be connected together in any suitable manner. For instance, in the illustrated arrangement, the two blocks 22, 30 can be securely assembled with one or more threaded fasteners 42 (see FIG. 2). It should be noted that throughout the application, any threaded fastener can be replaced by a suitable fastening arrangement, including but not limited to, snap-fit assemblies or components or press-fit components. Other suitable fastening arrangements also can be used. For instance, if the anchor 28 is positioned in a receptacle 38 in the upper block 22 and the wire passes through both blocks 22, 30, wraps around the lens 18 and is connected to the upper block 22, then tightening the wire 12 would tend to draw the two blocks 22, 30 together.

With reference to FIG. 3, the illustrated threaded fastener 42 is received within a countersunk bore 44, which bore 44 has a countersunk portion 46 and extends through the upper block 22. A bore 50 in the lower block 30 is generally aligned with the bore 44 in the upper block 22. The bore 50 in the lower block 30 preferably is threaded while the bore 44 in the upper block 22 is not.

With reference to FIGS. 5 and 6, the wire 12 can be adjusted by an adjustment screw 52 to a predetermined tension once the upper tensioning block 22 and the lower tensioning block 30 are securely assembled. In the illustrated arrangement, a threaded hole 54 is positioned in the lower block 30. The adjustment screw 52 is inserted into the hole 54. Preferably, the hole 54 intersects the passage 36 in a region in which the passage 36 has a wall opposite to the hole 54 but more than at least one diameter of the wire 12 from the intersection of the hole 54 and the passage 36 such that the adjustment screw can offset the wire.

When the adjustment screw 52 is threaded into the hole 54, the wire 12 is offset laterally within the passage 36. By offsetting the wire 12, the wire 12 is tightened around the lens 18. If the adjustment screw 52 is retracted from the hole 54, the wire 12 moves in a manner that allows the tension on the wire 12 to be reduced.

Figure 7:
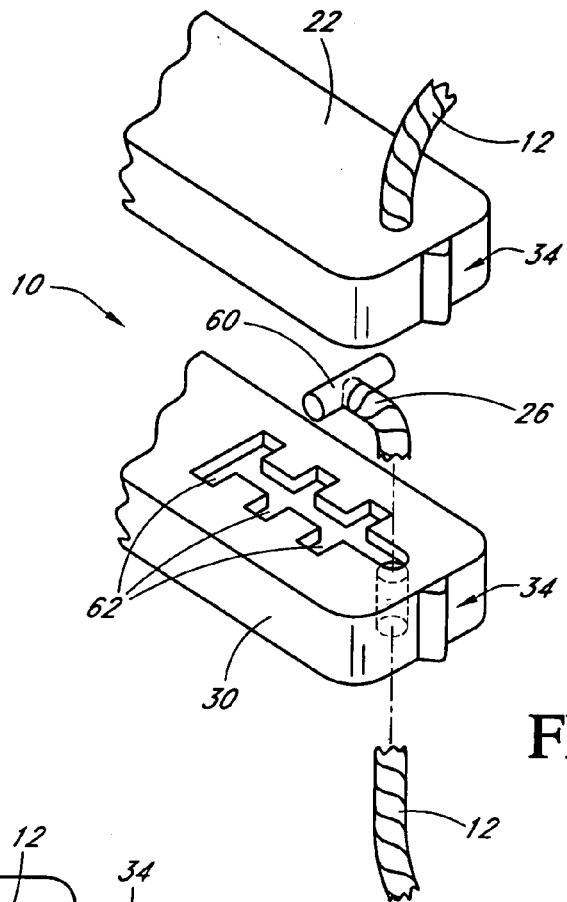
FIG. 7 is an exploded view of another wire tensioning system arranged and configured in accordance with certain features, aspects and advantages of the present invention.
Figure 8:
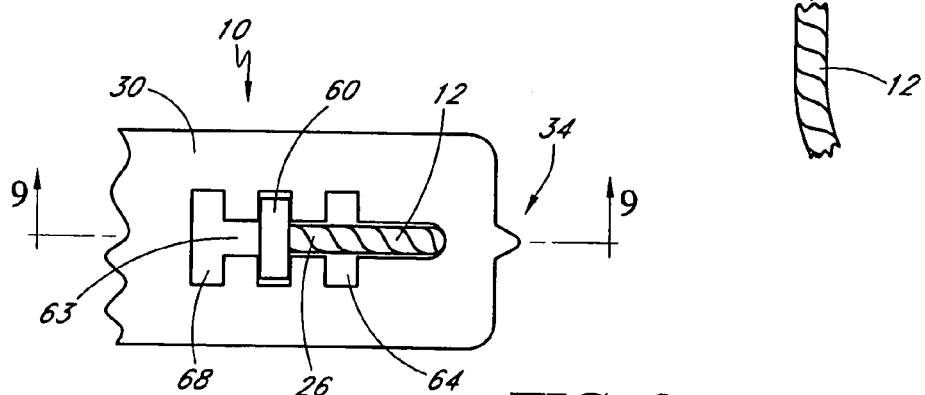
FIG. 8 is top plan view of a lower tensioning block of the system of FIG. 7 with different tab slots allowing a positioning tab to adjust tension applied to a wire used to generally circumscribe a lens.
Figure 9:
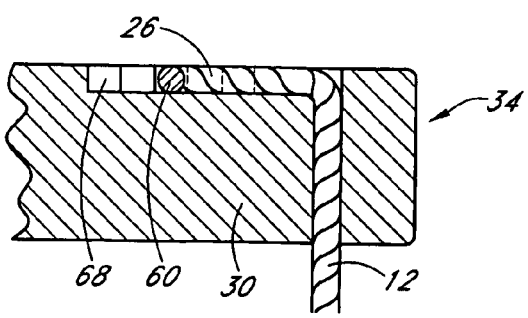
FIG. 9 is a sectioned view of the lower tensioning block taken along the line C-C of FIG. 8.

With reference to FIGS. 7-9, another preferred embodiment of a wire tensioning system 10 is shown. In this arrangement, an anchor bar 60 is attached to the second end 26' of the wire 12'. The lower tension block 30', in turn, comprises a number of slots 62. The slots 62 preferably are connected with a connecting slot 63. The connecting slot 63 accommodates a portion of the wire 12' as desired.

The slots 62, 63 preferably have a depth of at least the diameter of the wire 12'. In some arrangements, the slots 62, 63 can have depths that differ from each other. Moreover, in some arrangements, the slots 62, 63 can be formed such that the lower block 30' has a portion of the depth of the slots 62, 63 while the upper block 22' also has a portion of the depth of the slots 62, 63. Such a configuration, however, is less desirable from a manufacturing and assembly standpoint.

The anchor bar 60 advantageously can be positioned in one of the many possible slots 62 incorporated into the lower tensioning block 30'. Depending upon into which slot 62 the anchor bar 60 is placed, the tension on the wire 12' will increase or decrease. For example, if the anchor bar 60 is positioned in a slot 64 the length of the wire 12' will be a predetermined length corresponding to a wire tension. If, however, the anchor bar 60 is placed in a different slot 68, the length of the wire 12' will be another length corresponding to another wire tension. By positioning the anchor bar 60 in the different possible slots 62, the tension of the wire 12' can be adjusted to a proper wire tension.

While the illustrated arrangement shows a generally T-shaped anchor bar 60, other shapes also can be used. In addition, the slots 62, 63 can have different configurations, if desired. The various shapes of the anchor bar 60 and corresponding slots 62 can include, but are not limited to a ball shape, a square shape, or any shape that allows the filament wire 12 to be securely held in the corresponding slots 62 within the lower tensioning block 30.

In one arrangement, the slot 63 extends through the end of the combined blocks 22', 30' and the anchor bar 60 is angled rearward such that a point is defined toward the end of the combined blocks. In this arrangement, the anchor bar 60 preferably is slightly nonyieldably bendable such that the end of the wire 12' can be positioned to extend out of the combined blocks 22', 30' and pulled to increase the tension with the anchor bar 60 designed to reduce the likelihood that the wire 12' retracts out of the housing and reduces the tension once locked in position by the anchor bar 60.

While not shown, the blocks 22', 30' can be secured together in any suitable manner. For instance, the blocks 22', 30' can be connected with threaded fasteners, mechanical clips, clasps, interlocking structures, welding, soldering, brazing, adhesives, cohesion, or the like.

Figure 10:
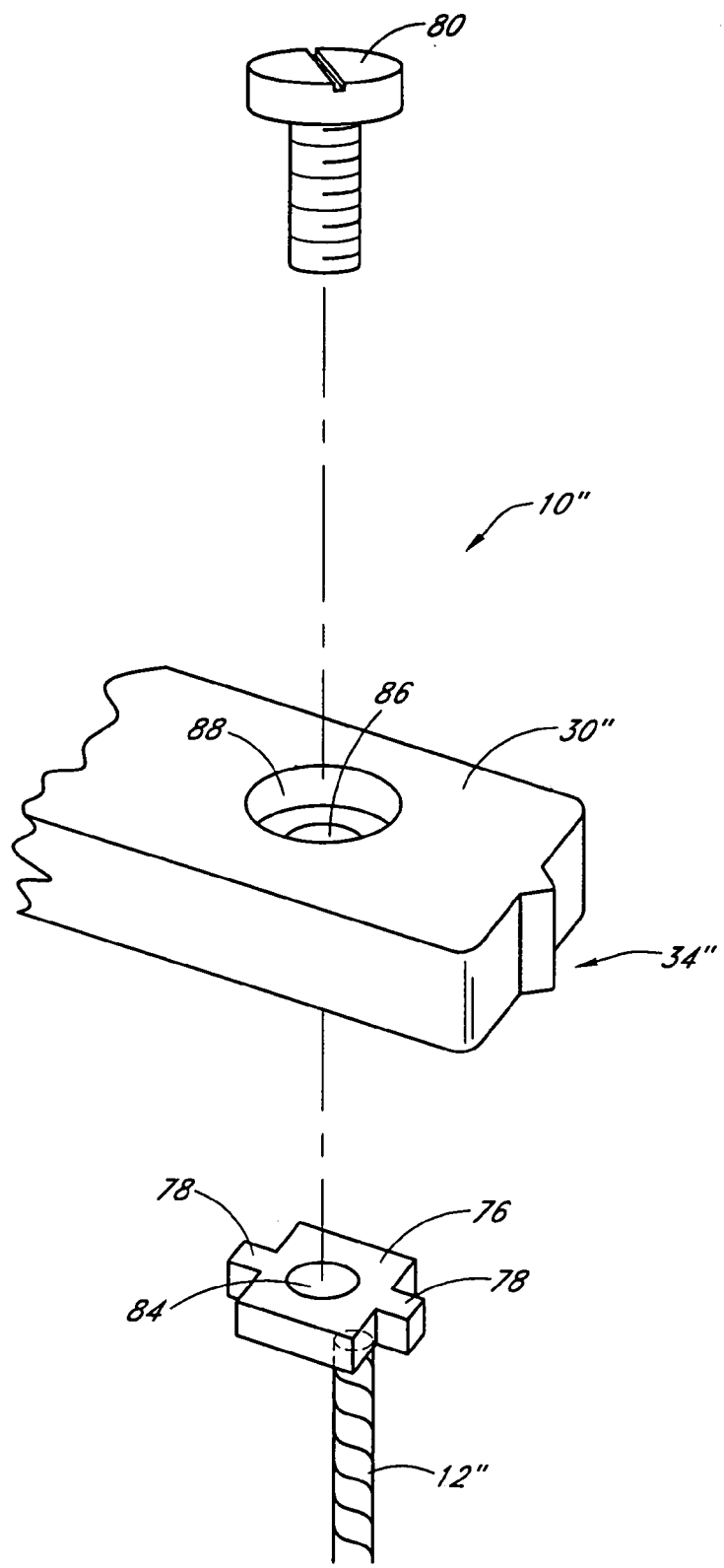
FIG. 10 is an exploded view of another wire tensioning system arranged and configured in accordance with certain features, aspects and advantages of the present invention and illustrating a tensioning screw and a corresponding threaded tensioning anchor.
Figure 11:
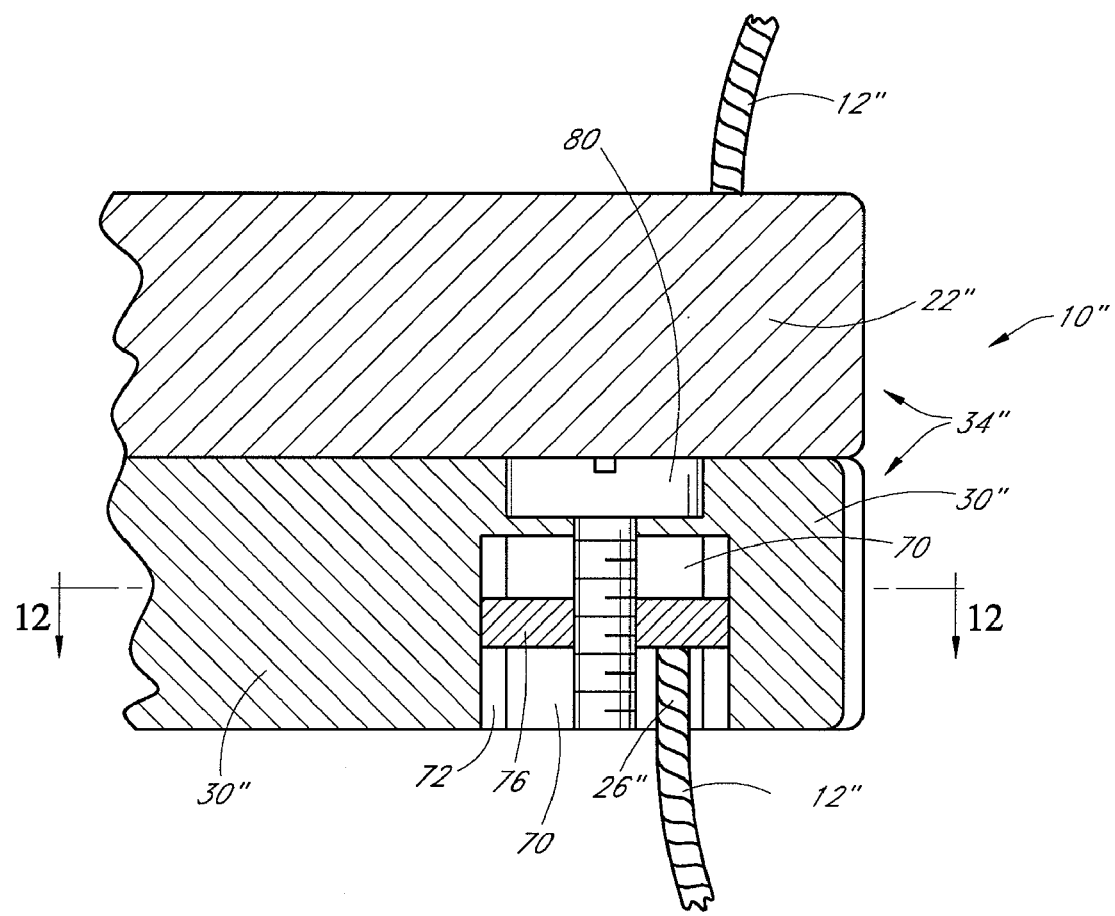
FIG. 11 is a sectioned view of the system of FIG. 10 and showing an upper tensioning block and the lower tensioning block.
Figure 12:
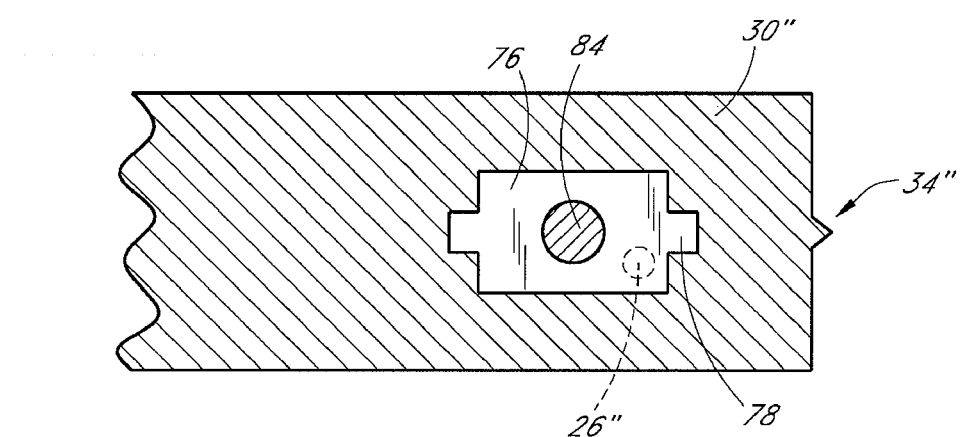
FIG. 12 is a sectioned view taken along the line D-D of FIG. 11.

With reference now to FIGS. 10-12, another wire tensioning system 10" is shown therein. Incorporated into the lower tensioning block 30" is an adjustment passage 70 (see FIG. 11) with at least one channel 72 that allows an anchor or adjustment block 76 to move up and down within the adjustment area 70. The adjustment block 76 preferably comprises a predetermined number of guide teeth 78 corresponding to the number of channels 72 in the adjustment area 70. The guide teeth 78 generally maintain the adjustment block 76 in a desired orientation. Other sizes, shapes and configurations of adjustments blocks 76 and passages 70 also can be used.

A threaded member 80 extends through at least a portion of the block 30". The illustrated threaded member 80 is positioned inside a through hole 86 in the lower tensioning block 30" and against a shoulder 88. The threaded member 80 preferably engages with a threaded portion 84 of the adjustment block 76 such that rotating the threaded member 80 drives the adjustment block 76 along the length of the screw. In the illustrated arrangement, the adjustment block 76 is suitably connected to the wire 12" such that movement of the adjustment block 76 increases and decreases the tension of the wire 12".

Figure 13:
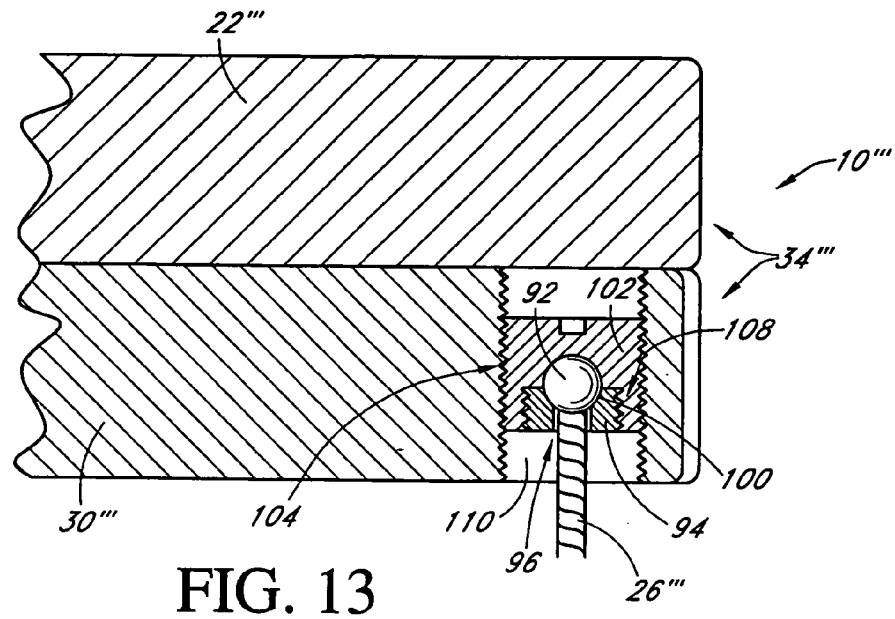
FIG. 13 is a sectioned view of another wire tensioning system arranged and configured in accordance with certain features, aspects and advantages of the present invention and illustrating a two piece threaded tensioning anchor.
Figure 14:
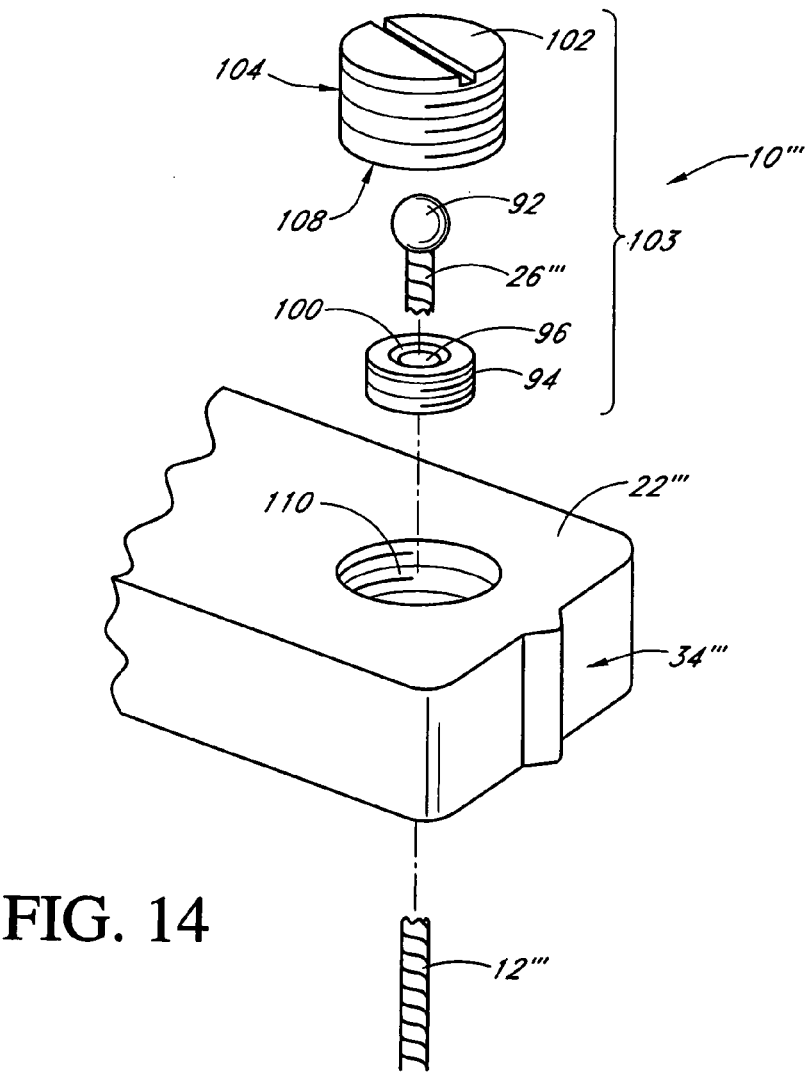
FIG. 14 is an exploded perspective view of the system of FIG. 13.
Figure 18:
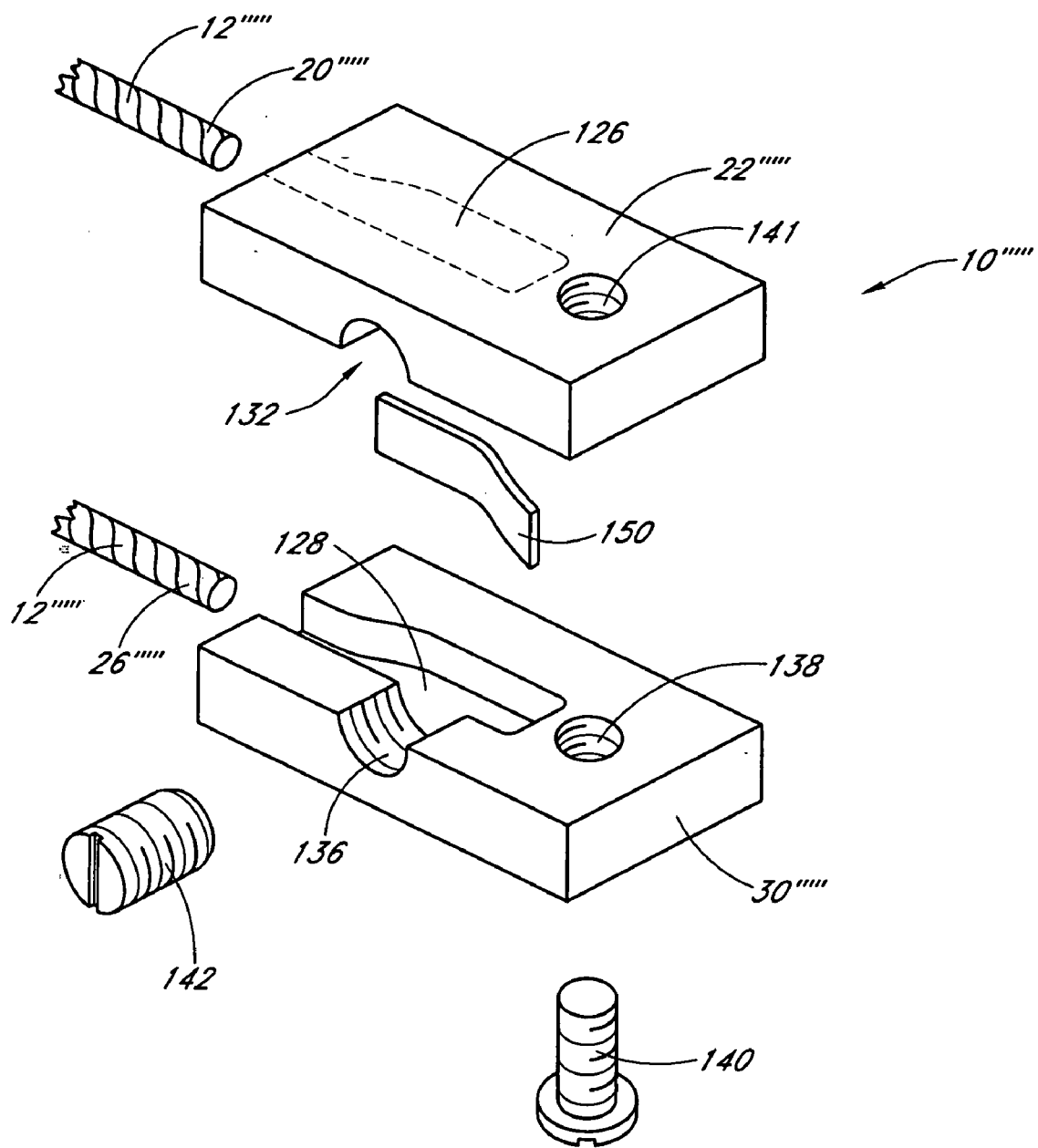
FIG. 18 is an exploded perspective view of another wire tensioning system arranged and configured in accordance with certain features, aspects and advantages of the present invention and illustrating upper and lower tensioning blocks and a tensioning plate used to adjust the tension of the wire.
Figure 19:
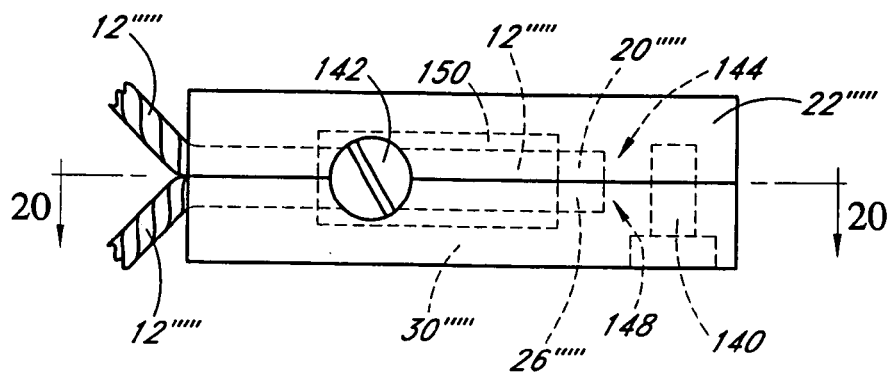
FIG. 19 is an elevation view of the system of FIG. 18 illustrating an adjustment screw that contacts a portion of the tensioning plate, which is shown in phantom.
Figure 20:
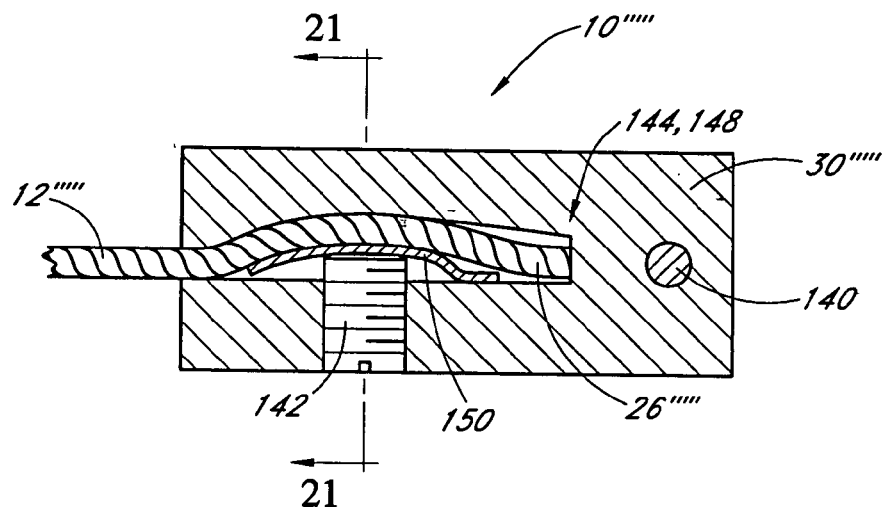
FIG. 20 is a sectioned view taken along the line F-F of FIG. 19.
Figure 21:
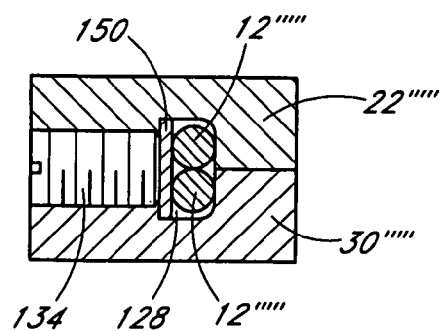
FIG. 21 is a sectioned view taken along the line G-G of FIG. 20.

With reference now to FIGS. 13 and 14, another wire tensioning system 10''' is illustrated therein. In the illustrated arrangement, an anchor 92 is attached to the second end 26''' of the filament wire 12'''. In the illustrated arrangement, the anchor 92 is generally spherical; however, other sizes, shapes and configurations of an anchor 92 also can be used, including but not limited to expanded wire diameters, knots, and separate components that are attached to the wire in any suitable manner.

With reference to FIG. 14, an externally threaded socket ring 94 allows the wire 12''' to pass through a through hole 96 that forms an integrated socket 100 where the ball anchor 92 can rest and rotate within the socket 100. It is advantageous that the socket 100 can rotate relative to the anchor 92. Other suitable socket configurations also can be used.

An adjustment screw 102 preferably has an outer threaded surface 104 as well as an inner threaded bore 108. The threaded socket ring 94 advantageously is received within the threaded bore 108 such that the anchor 92 can be captured within the adjustment screw 102. The adjustment screw assembly 103, which comprises the anchor 92, the second end 26 of the wire 12, and the socket ring 94, then can be threaded into either of the tensioning blocks. Preferably, however, the adjustment screw assembly 103 is positioned within the lower tensioning block 30'''.

When assembled, the wire tensioning system 10''' illustrated in FIGS. 13 and 14 allows the wire tension to be adjusted as the adjusting screw 102 is rotated. For example, if the adjusting screw 102 is rotated in one direction, the captured anchor 92 pulls on the wire 12''' to increase the tension of the wire 12'''. If the adjustment screw 102 is rotated in the opposite direction, the tension of the wire 12 is decreased.

With reference now to FIGS. 15-17, a further wire tensioning system 10'''' is shown. In this arrangement, the second end 26'''' of the filament wire 12'''' is advantageously attached to a mounting plate 112. The mounting plate 112 and numerous similarly shaped shims 116 each comprise a hole 118 through which a fastening screw 120 can pass. The upper tensioning block 22'''' has a threaded hole 124 that receives the fastening screw 120 and allows the fastening screw 124 to secure the mounting plate 112 as well as at least any desired shims 116.

Adding shims 116 between the mounting plate 112 and the upper tensioning block 22'''' reduces the tension around the lens 18'''' (FIG. 16). For example, if one shim 116 is placed between the mounting plate 112 and the upper tensioning block 22'''', then the tension in the wire 12'''' will be higher than if two or more shims 116 are placed between the mounting plate 112 and the upper tensioning block 22''''. Shims 116 that are not used to determine the tension in the wire 12'''' can be placed between the mounting plate 112 and the screw 120, if desired. Therefore, all the shims 116 can be assembled together between the screw 120 and the upper tensioning block 22'''', however only the shims that are placed between the mounting plate 112 and the upper tensioning block 22'''' will determine the tension in the wire 12''''.

With reference to FIGS. 18-21, a further wire tensioning system 10''''' will be described. The upper tensioning block 22''''' has a tensioning recess 126. The lower tensioning block 30''''' has a tensioning recess 128 that is similar in shape to and is positioned relatively opposite the upper tensioning block recess 126. In some arrangements, the entire recess can be formed in a single tensioning block. The recesses have a portion that is substantially width as one diameter of the wire and another larger portion that allows a length of the cable to be offset within the recess. Offsetting the cable, as will be described below, allows the tension to be adjusted within the system 10'''''.

The two tension blocks 22''''', 30''''' can be connected in any suitable manner. For instance, in the illustrated arrangement, an upper threaded portion 132 of a threaded hole 134 is positioned in the upper tensioning block 22''''' and a lower threaded portion 136 of the threaded hole 134 is positioned in the lower tensioning block 30'''''. It is envisioned that one block may have a threaded hole in its entirety.

In the illustrated arrangement, the lower tensioning block 30''''' includes a through hole 138 that allows a screw 140 to pass through and enter a threaded hole 141 located in the upper tensioning block 22'''''. When the upper tensioning block and the lower tensioning block are assembled and held together by the screw 140 (see FIG. 20), the upper threaded portion 132 and the lower threaded portion 136 form the threaded hole 134 described above. The threaded hole 134 receives an adjustment screw 142 and allows the adjustment screw 142 to change the tension in the filament wire 12'''''.

The first end 20''''' of the wire 12''''' is advantageously attached to the upper tensioning block 22''''' at point 144. The second end 26 of the wire 12''''' is advantageously attached to the lower tensioning block 30''''' at a point 148. The first end 20''''' and second end 26''''' of the wire 12''''' can be secured to the upper tensioning block 22''''' and to the lower tensioning block 30''''', respectively, in any suitable manner, including but not limited to, bonding, welding, or secured by any suitable fastener.

In the illustrated arrangement, a tension plate 150 is placed between the adjustment screw 142 and the wires 12''''' (see FIGS. 19-21) within the tensioning recesses 126 and 128. Because the wire ends 20''''', 26''''' are attached to the upper and lower tensioning blocks 22''''', 30''''' respectively, when the adjusting screw 142 is rotated against the tension plate 150, the tension plate 150 changes the tension of the wires 12'''''. This change in tension allows the wire to tighten or loosen around the lens. When the adjustment screw 142 is rotated in one direction the tensioning plate 150 can increase the tension of the attached wires. If, however, the adjustment screw 142 is rotated in the opposite direction, the tensioning plate 150 can decrease the tension of the attached wires 12'''.

With reference now to FIGS. 24-29, any of the eyewear described above can receive any of a number of bridge constructions. The bridge constructions facilitate the joining of both lenses 18. FIGS. 24-29 illustrate four variations of bridge constructions. Other bridge designs also can be used if desired.

Figure 24:
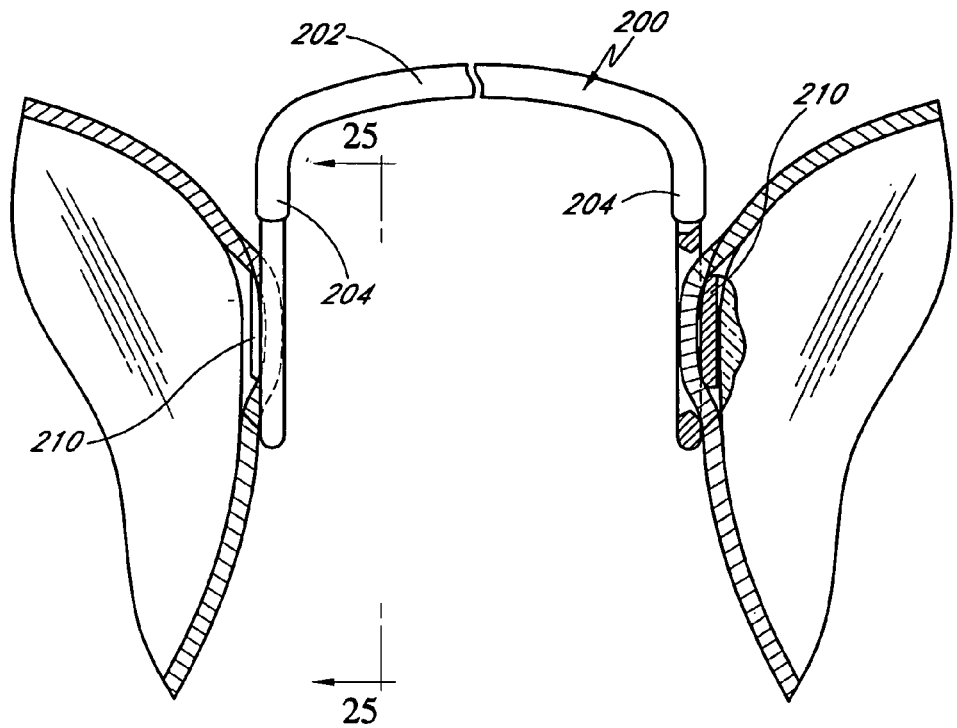
FIG. 24 is an illustration of a bridge construction for eyewear arranged and configured in accordance with some embodiments of the present invention.
Figure 25:
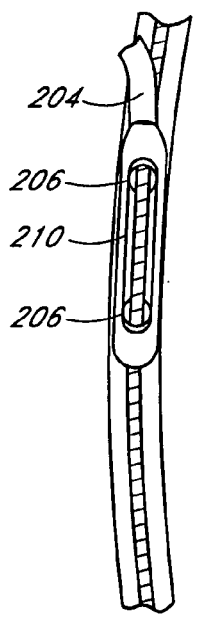
FIG. 25 is a view along the line H-H of the bridge construction shown in FIG. 24.

With reference now to FIGS. 24 and 25, a bridge 200 is illustrated therein. The bridge 200 can comprise a central portion 202 and a pair of legs 204. The legs extend generally downward from the central portion 202 and, together with the central portion 202, define a generally inverted U-shaped bridge 200. While other dimension can be practicable, for a robust design, the legs 204 preferably have a thickness (see FIG. 24) that is at least one wire diameter while the legs 204 preferably have a width (see FIG. 25) that is at least two wire diameters. Moreover, the bridge 200 can have any suitable cross-sectional shape, including portions having differing cross-sections. For instance, the central portion 202 can be cylindrical, tubular, rectangular, square, oval or the like. In addition, the legs 204 can be generally flat but other cross-sectional shapes also can be used.

At least one hole 206 preferably is formed in each of the pair of legs 204. In the illustrated arrangement, two holes 206 are positioned in each of the legs 204. In some embodiments three or more holes can be used. Having two holes 206 is believed to improve the ability of the bridge to remain in position once the associated eyewear is fully assembled and in use. Moreover, in frame assembles that featuring fully adjustable lengths (e.g., lenses of substantially different perimeter dimensions can be accommodated), the position of the bridge 200 along the wire can be fully adjusted into a desired position. Similarly, in frame assemblies featuring the ability to accommodate differing shapes but not necessarily different perimeter dimensions, the bridge 200 can be repositioned relative to the lens shape until a desired positioning is achieved.

The holes 206 preferably are greater than one diameter of the wire and less than two diameters of the wire. In some constructions, the holes 206 can be greater than two diameters of the wire, but such sizing may result in an increased width of the legs 204, which may be less desirable in some eyewear configurations.

The holes 206 preferably are formed with a recessed or inset region 210 of the legs 204 extending between the holes 206. The inset region 210 preferably is sized and configured to be accepted within the groove of the associated lens. Such a construction allows at least a portion of the width legs 204, not necessarily including the inset region 210, to abut a surface of the perimeter of the associated lens. Moreover, in the illustrated arrangement, the wire advantageously does not protrude beyond the legs 204. Such a construction aids in the appearance of a rimless look. In some embodiments, however, the wire can extend slightly beyond the surface of leg 204 such that the wire slightly protrudes from the leg 204. In such constructions, the recess 210 can have a decreased dimension or the legs 204 can have a smaller overall dimension.

In use, the wire can be threaded through the holes 206 prior to assembly of the associated wire and lens components. The bridge 200 can be positioned along the lenses as desired and can be secured in position when the wire is closed in a loop. The wire tension can be adjusted in any manner set forth above and with any suitable construction, including those discussed above.

Figure 26:
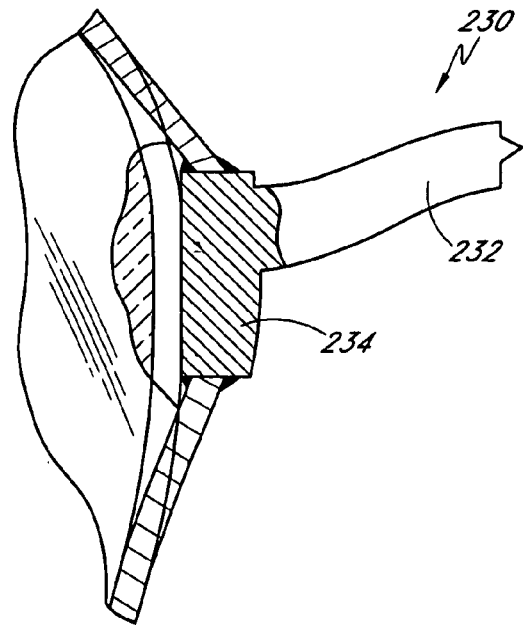
FIG. 26 is an illustration of another bridge construction for eyewear arranged and configured in accordance with some embodiments of the present invention.

With reference now to FIG. 26, a bridge 230 is illustrated therein. The bridge 230 comprises a central portion 232 with a short extension 234 positioned at each end of the central portion. In some arrangements, the extensions 234 can be omitted. Moreover, any suitable cross-sectional shapes can be used for the central portion 232 and the extensions 234. In the illustrated arrangement, a pair of wires (or wire portions) are fixed to the extensions 234. The wires (or wire portions) can be fixed in any suitable manner, including but not limited to soldering, welding, adhering, or mechanically interlocking structures. Furthermore, the ends of the wires (or wire portions) can be directly fixed to the central portion 232, if desired. This construction allows the placement of the bridge to be securely fixed relative to the lens when the eyewear is fully assembled. Moreover, this construction facilitates correct alignment of the lens axis because the bridge position is not likely to shift along the length of the wire during or after assembly.

With reference now to FIGS. 27 and 28, a further bridge 240 is illustrated therein. In this arrangement, the bridge 240 generally comprises a central portion 242 and a short extension 244 positioned at each end of the central portion. In some arrangements, legs similar to those shown in FIGS. 24 and 25 can be used in place of the extensions 244. Similar to each of the constructions described above, the bridge and its component(s) can have any suitable cross-sectional configuration. Moreover, the cross-sectional configuration can be varied along any portion of the bridge.

A passage 246 preferably extends through at least a portion of each extension 244. In the illustrated arrangement, the passage 246 extends through the full length of the extension 244 but other constructions can feature passages that extend through a limited portion of the extension. Moreover, in some variations, the passage 246 can extend through an end of the central portion and the extensions 244 can be omitted. The passage can have any suitable cross-sectional configuration. In some arrangements, the passage 246 is cylindrical or has an elliptical or oval cross-section. Preferably, at least one lateral dimension of the passage 246 is greater than one diameter of the associated wire. Similarly, the extension 244 preferably is larger than at least two diameters of the associated wire such that a robust construction results. The dimensions of the components can be varied as desired.

With respect to the arrangement of FIGS. 27 and 28, the bridge 240 can be used with eyewear having a fixed wire length or a fully adjustable wire length. The bridge 240 can be moved along the length of the wire to achieve a desired bridge placement. Moreover, the bridge can be easily removed from the wire and be replaced on a different wire, which allows the wire to be replaced as needed or desired. The bridge 240 also advantageously allows the connection to the wire to be substantially hidden when the eyewear is fully assembled, which can be desired in some eyewear constructions. The obscured attachment location further enhances the rimless appearance of the eyewear with which the bridge 240 is used.

With reference to FIG. 29 a further bridge 260 is illustrated therein. In this arrangement, as with those described above, the bridge 260 generally comprises a central portion 262 and a short extension 264 positioned at each end of the central portion 262. In some arrangements, legs similar to those shown in FIGS. 24 and 25 can be used in place of the extensions 264. Similar to each of the constructions described above, the bridge and its component(s) can have any suitable cross-sectional configuration. Moreover, the cross-sectional configuration can be varied along any portion of the bridge.

A passage 266 preferably extends through at least a portion of each extension 264. In the illustrated arrangement, the passage 246 extends through the full length of the extension 264 but other constructions can feature passages that extend through a limited portion of the extension. Moreover, in some variations, the passage 266 can extend through an end of the central portion and the extensions 264 can be omitted. The passage 266 can have any suitable cross-sectional configuration. In some arrangements, the passage 266 is cylindrical or has an elliptical or oval cross-section. Preferably, at least one lateral dimension of the passage 266 is greater than one diameter of the associated wire. Similarly, the extension 264 preferably is larger than at least two diameters of the associated wire such that a robust construction results. The dimensions of the components can be varied as desired.

While the bridge 260 of FIG. 29 is similar to the bridge 240 of FIG. 28, the bridge 260 of FIG. 29 further includes a wire locking mechanism 270. The locking mechanism 270 comprises a projection 272 that extends through an opening 274. The projection 272 has a length sufficient to contact a portion of the wire that passes through the passage 266. In some arrangements, the projection is formed on a leaf 276. In further arrangements, another projection 278 can be positioned on an opposite side of the leaf 276. This opposing projection 278 preferably is sized and configured to fit within the groove formed in the peripheral surface of the lens. If the portion of the leaf 276 carrying the projections 272, 278 is slightly offset, as in the illustrated arrangement, the opposing projection can be smaller than the diameter of the wire or the depth of the groove in the lens.

The leaf 276 can be secured to the extension 264 with the projection 272 positioned in the opening 274 and the opposing projection 278 extending toward the ultimate position of the lens. Thus, as the lens is positioned and tightened in its location adjacent to the extension 264, the lens contacts the opposing projection 278, which urges the projection 272 through the opening 274 and into engagement with the wire.

Preferably a recess 280 is formed in the passage 266 to allow the wire to be offset into the recess 280. In some arrangements, the recess 280 is formed when the opening 274 is formed through the extension 264. The wire preferably is sufficiently flexible to allow the wire to be offset into the recess when the eyewear is being assembled and the tension is being adjusted on the wire.

In assembling eyewear comprising any of the above-described tensioning systems, the lens is first prepared and a groove is formed in an outer peripheral edge of the lens. The cable is secured to the tensioning block or blocks, as set forth above. The cable then is closed about the lens with the cable being positioned within the groove. The cable can be slightly tightened about the lens to allow the cable to securely mount at least one a pair of temples or a bridge. In some situations, the cable can be slightly loosened to allow the tension blocks or the cable to be securely closed about the lens. Tightening and loosening the cable is cable in the manners set forth above.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For instance, the exterior shape and dimensions of the closing members, housings or projections can be any suitable shape or configuration, including the use of curved or straight surfaces in the place of straight or curved surfaces so long as the wire and/or any tensioning components can be properly attached thereto, positioned there within or associated therewith. Moreover, any of the closing members, housings or projections described herein can have legs or projections that extend along a portion of the lens surface, for aesthetic reasons and/or to add additional desired support to the assembly by increasing the contact area between the component and the respective lens.

It is also contemplated that various combinations or subcombinations of the specific features and aspects of the embodiments may be made and still fall within the scope of the invention. It should be understood that various features and aspects of the disclosed embodiments can be combined with or substituted for one another in order to form varying modes of the disclosed invention. Moreover, some variations that have been described with respect to one embodiment and not another embodiment can be used with such other embodiments. Moreover, while most of the embodiments above are shown with symmetrical constructions, it is practicable to use constructions that vary from the left lens to the right lens and such constructions would not necessarily avoid the scope of protection afforded to the disclosed embodiments. Many other variations also have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. Eyewear comprising a first lens and a second lens, a first wire substantially encircling said first lens, a second wire substantially encircling said second lens, a first tensioning assembly connecting two ends of said first wire and comprising a threaded fastener, the first tensioning assembly comprising a first housing, a second tensioning assembly connecting two ends of said second wire, and an anchor attached to an end of said first wire, said anchor being at least partially recessed into said first housing, said threaded fastener extending into said anchor such that rotation of said threaded fastener results in movement of said anchor such that a level of tension in said first wire can be adjusted through movement of said threaded fastener.

2. The eyewear of claim 1, wherein said anchor is not rotatable within the first housing that forms a portion of said first tensioning assembly.

3. The eyewear of claim 1, wherein said first wire is selectively adjustable to secure lenses of various shapes.

4. The eyewear of claim 1, wherein said first wire is selectively adjustable to secure lenses of various sizes and/or shapes.

5. Eyewear comprising a lens, said lens comprising a peripheral side surface, a groove being formed in said side surface, at least one wire generally encircling said lens, at least a portion of said wire being positioned within said groove, said wire comprising a first end and a second end, a first block connected to said first end of said wire, a second block connected to said first block, said second block comprising an adjustment passage, said adjustment passage comprising a channel, an adjustment block being secured to said second end of said wire, said adjustment block comprising a tooth, said adjustment block being moveably positioned within said adjustment passage with said tooth being positioned within said channel, said adjustment block comprising a threaded portion, a threaded member extending through a portion of said second block and engaging said threaded portion such that rotation of said threaded member results in movement of said adjustment block.

6. The eyewear of claim 5, wherein said threaded member is a screw and said threaded portion is an internally threaded hole.

7. The eyewear of claim 6, wherein said screw comprises a head and said second block comprises a shoulder, said head being seated adjacent said shoulder when said screw is tightened.

8. The eyewear of claim 7, wherein the screw head is flush with said second block when inserted.

9. The eyewear of claim 5, wherein said wire is selectively adjustable to secure lenses of various shapes.

10. The eyewear of claim 5, wherein said wire is selectively adjustable to secure lenses of various sizes and/or shapes.

11. The eyewear of claim 5, wherein said adjustment block is captured by said first block and said second block.

12. The eyewear of claim 5, wherein a first end of said threaded member is disposed substantially level with a surface of said second block.

13. The eyewear of claim 12, wherein said first end of the threaded member is disposed substantially level with the surface of said second block that is disposed between said second block and said first block.

14. The eyewear of claim 5, wherein said threaded member can be rotated before said first block and said second block are coupled.

15. The eyewear of claim 5, wherein said adjustable member is constrained to move in only one dimension.

* * * * *